2 Sheets—Sheet 1.

W. TAYLOR.
Harpoon.

No. 206,694.  Patented Aug. 6, 1878.

WITNESSES:
Chas. H. Kimball.
Frank M. Sennette

INVENTOR:
William Taylor
Per att'y
William Henry Clifford

2 Sheets—Sheet 2.

W. TAYLOR.
Harpoon.

No. 206,694.      Patented Aug. 6, 1878.

WITNESSES:
Chas. H. Kimball.
Frank M. Bennetts

INVENTOR:
William Taylor
Per atty
William Henry Clifford

UNITED STATES PATENT OFFICE.

WILLIAM TAYLOR, OF PORTLAND, MAINE.

IMPROVEMENT IN HARPOONS.

Specification forming part of Letters Patent No. 206,694, dated August 6, 1878; application filed May 21, 1878.

*To all whom it may concern:*

Be it known that I, WILLIAM TAYLOR, of Portland, in the county of Cumberland and State of Maine, have invented certain new and useful Improvements in Harpoons; and I do hereby declare that the following is a full, clear, and exact description thereof, which will enable others skilled in the art to which it appertains to make and use the same, reference being had to the accompanying drawings, and to letters of reference marked thereon, which form a part of this specification.

Figure 1:
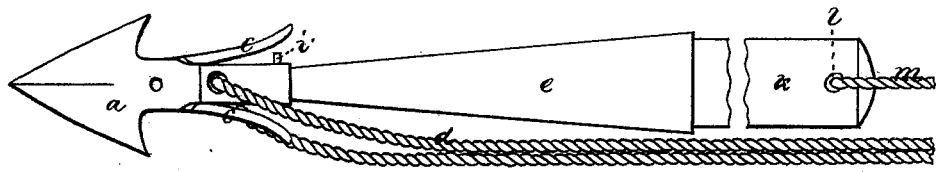
Figure 2:
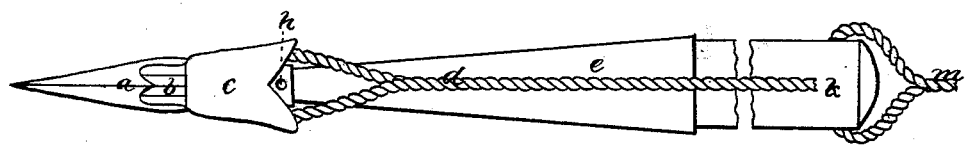
Figure 3:
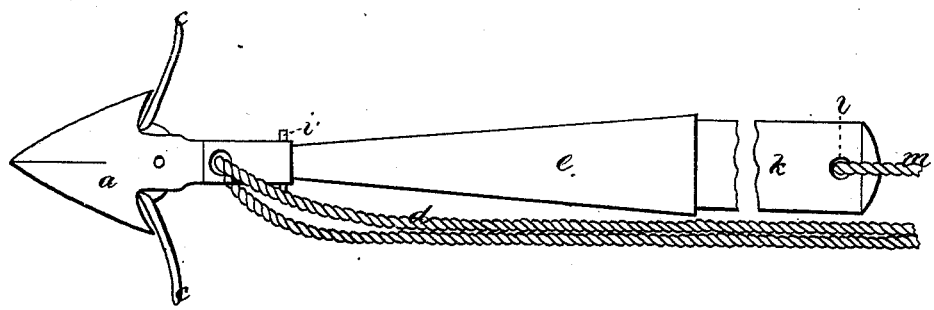
Figure 4:
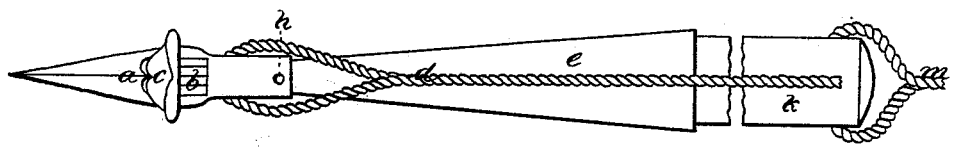
Figure 5:
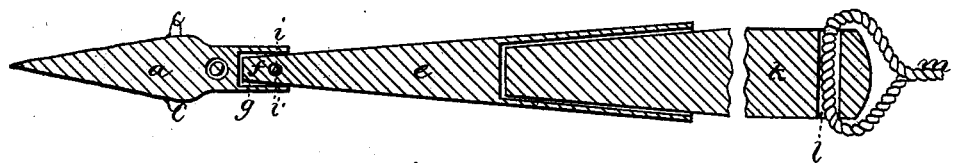

Figure 1 is a side view to show edges of wings. Fig. 2 is the same to show flat faces of same. Fig. 3 is a side view with wings open; Fig. 4, side view with wings slightly raised, showing socket $b$. Fig. 5 is a section.

Same letters show like parts.

The purpose of my invention is to produce certain improvements in harpoons.

$a$ is the head of the harpoon. Immediately behind the barbs I hinge into a slot, $b$, cut through the iron or metal at that point the two wings $c$. These are capable of opening or closing, as illustrated in the drawings. When the harpoon is passing through the air, or when being thrust at or entering into the fish, these two wings are down flat, as seen in Figs. 1 and 2. When the fish begins or continues to draw on the line $d$, these two wings are opened by the flesh of the fish, and thus act to very firmly hold the head in the body of the fish.

$e$ is an iron socket-piece, with a point, $f$, fitting the socket $g$ in the head $a$, and having a small hole, $h$, to match with the hole $i$. When the point $f$ is thrust into the socket $g$, a small and easily-broken pin is inserted into the holes $h$ and $i$. It may be of soft wood, (see $i$.) The socket-piece $e$ has a wooden shaft or pole, $k$. This has a ring or hole, $l$, in its end, to which is attached the line $m$.

When the head $a$ is entered or thrust into the fish, the socket, with the staff or pole $k$, is easily detached from the socket in the head $a$. The line in the pole $k$ enables the socket-piece and pole to be withdrawn from the head $a$ after the head or spear has been thrust or driven into the fish. When the pole and socket-piece are thus withdrawn, there is no leverage on the head $a$ by the weight of said pole and socket, which might have a tendency to work the head $a$ out of the fish, and so render his capture less secure. If the pole and socket-piece were left attached to the head $a$, it would be likely to work out by their weight, and thus a fish be lost; but with the arrangements which I provide for removing the socket-piece and pole, this danger is obviated. The head $a$, with its wings, when the pole and socket-piece are withdrawn, is held securely in the body of the fish, because, when the line $d$ begins to draw, the wings are quickly forced open by the flesh of the fish, and thus hold in the head with all the resistance of the meat of the fish to the tearing out of the two wings.

There is an implement used called a "dart," with one wing, and that one fixed to the head, and having a slight outward curve; but the operation of that is to turn around at right angles to the direction of the line $d$ when the fish begins to draw. This takes such a wide curve that the dart often pulls out, especially if the shaft or pole is not quickly detached from the head. With my improvement the wings are quickly spread, and the shaft or pole readily detached.

What I claim as my invention, and desire to secure by Letters Patent, is—

In a harpoon, in combination with the pole $k$ and line $m$, the socket $e$, as described, and provided with a hole for the pin $i$, and the head $a$, having slot $b$, socket $g$, hole $h$, and wings $c$, substantially as described.

In testimony that I claim the foregoing as my own I affix my signature in presence of two witnesses.

WILLIAM TAYLOR.

Witnesses:
CHAS. H. KIMBALL,
EDWARD K. MILLIKEN.